Figure 1:
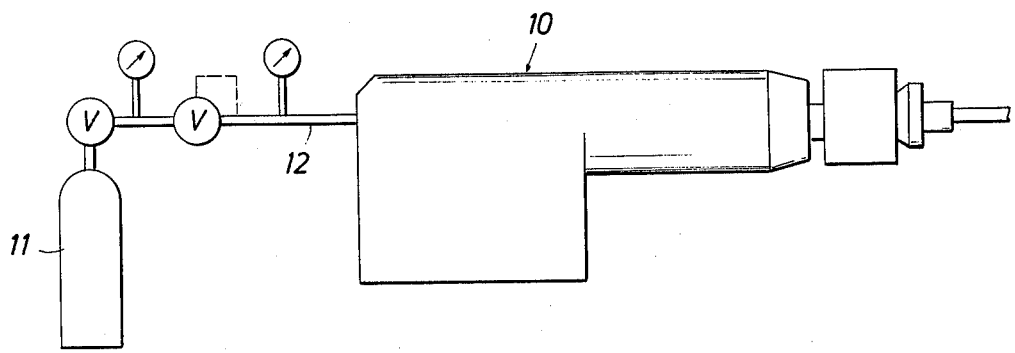

United States Patent [19]
Vermeulen

[11] 3,986,709
[45] Oct. 19, 1976

[54] DIRECT GASSING EXTRUDER WITH GAS POCKETS
[75] Inventor: Willem Vermeulen, Delft, Netherlands
[73] Assignee: Shell Oil Company, Houston, Tex.
[22] Filed: Feb. 7, 1975
[21] Appl. No.: 547,904

Related U.S. Application Data
[63] Continuation of Ser. No. 380,635, July 19, 1973, abandoned.

[52] U.S. Cl. ............................................. 259/191
[51] Int. Cl.² ...................... A21C 1/06; B29H 1/10
[58] Field of Search ............ 259/191, 21, 13, 192, 259/6, 7, 9, 10, 25, 26, 45, 46

[56] References Cited
UNITED STATES PATENTS

| | | | |
|---|---|---|---|
| 2,020,878 | 11/1935 | Doering | 259/9 |
| 2,556,276 | 6/1951 | Henning | 259/191 |
| 2,626,856 | 1/1953 | Alles | 259/9 X |
| 2,813,704 | 11/1957 | MacKissic | 259/45 X |
| 3,375,549 | 4/1968 | Geyer | 259/46 X |
| 3,570,654 | 3/1971 | Hill | 259/9 |
| 3,687,423 | 8/1972 | Koch | 259/191 |

FOREIGN PATENTS OR APPLICATIONS

| 1,142,059 | 1/1963 | Germany | 259/191 |
|---|---|---|---|

Primary Examiner—Stanley N. Gilreath
Assistant Examiner—Donald B. Massenberg

[57] ABSTRACT

In a single screw extruder particularly adapted for extrusion of foamed or foamable thermoplastic material by direct injection of gas or volatilizable liquid into the molten feed in the extruder, an improved means for mixing the gaseous or volatilizable liquid blowing agent with the molten feed in the extruder comprises a flow barrier between two adjacent flights of the worm screw and a gap in the foremost one of said adjacent screw flights, such that substantially the total polymer mass being forwarded by the screw is forced through the gap and the flow channel section behind the flow barrier remains substantially free of polymer over about one complete revolution of the screw, the blowing agent being injected into a space which is substantially free of polymer mass from a conduit inside the root of the screw through at least one opening between said adjacent flights and near that gap. This provides a relatively large area of contact between the blowing agent and polymer, conducive to fast and uniform diffusion of the blowing agent into the polymer.

The same construction is also adaptable to devolatilizing of a polymer mass containing some volatilizable fluid material.

4 Claims, 3 Drawing Figures

DIRECT GASSING EXTRUDER WITH GAS POCKETS

This is a continuation of application Ser. No. 380,635, filed July 19, 1973, now abandoned.

The invention concerns a single screw extruder for polymer extrusion comprising means for injection of gas or volatilizable fluid into or withdrawal of volatiles from the polymer in the extruder.

Extruders of this kind are widely used for the extrusion of synthetic thermoplastics polymers. A gas or volatilizable liquid injected into the molten material in the extruder acts as a foaming agent, whereby the extruded product will acquire a cellular structure. To ensure that the foam cells in the extrudate are of uniform size and are well-distributed, it is necessary that the blowing or foaming agent be thoroughly and uniformly blended with the polymer. Foaming agent is convenionally injected into the molten polymer through one or more injection ports in the wall of the extrusion cylinder surrounding the worm screw. To distribute the gas or liquid, received from only one or a few injection points, uniformly and finely over the mass of molten polymer, a rather long worm screw section is required between the injection points and the forward end of the extruder.

Apart from the increased power requirements and constructional problems and costs associated with the use of long extrusion screws — extrusion screws of which the length/diameter ratio ($l/d$) is more than 20 — the operation of such lengthy extruders is difficult in terms of achieving stability in the rate of extrusion and composition of the extrudate. Moreover, as a result of the heat generated by the worm screw, heat-sensitive materials such as polyvinylchloride are subject to degradation in lengthy extruders.

In another use of extruders, the feed is a polymer mass containing a small amount of volatile material which it is necessary to remove during the extrusion process. While the extruder of this invention has been designed primarily to overcome the problems named above with respect to extrusion of foamable material, it is also adapted for use as such a so-called devolatilizing extruder.

It is an object of the invention to provide an extruder particularly suitable for the addition of a gas or liquid into the material being transported in the extruder, which is of relatively simple construction and of restricted length, and yet is effective in blending the added gas or liquid homogeneously into the material being extruded.

Accordingly, the invention provides an extruder comprising a rotatable worm screw provided with a flow barrier extending between adjacent worm flights, the foremost flight of these adjacent flights having a gap near the forward, or pushing side of the flow barrier, whereby, when the extruder is in operation, material being forwarded by the rotating worm screw is arrested by the flow barrier and is forced through said gap, the worm screw further being provided with a passage for the supply or withdrawal of a fluid to or from the flow channel between the worm screw flights at a point shortly behind the flow barrier i.e., near its rearward side.

The flow barrier should obstruct the flow of all or most of the material moving towards the flow barrier so as to force it through the nearby gap in the following worm flight. Therefore, the flow barrier should preferably extend over the full width of the flow channel between two flights, its height being the same as the height of the flights. The pushing side of the flow barrier may make an angle with the axis of the worm screw, in a manner so as to facilitate the flow of the polymer mass towards the gap while avoiding the creation of stagnant zones. For ease of construction, the flow barrier may be a plate-like member, placed either at an angle or parallel to the screw axis, the thickness of the plate being of the same order as that of the worm flights.

The width of the gap in the flight (as measured along the flight) can be less than the width of the flow channel formed between the flights (as measured normal to the flights), and is preferably from 20 to 80% of the pitch of the worm. As a result, a large proportion of the polymer passing through the gap is in direct contact with the foaming agent which has accumulated in the polymer-free pocket behind the flow barrier; this is conducive to the fast and uniform incorporation of the foaming agent into the polymer mass. The fluid passage for the supply of the foaming agent can be a bore inside the root of the screw, extending co-axially with the screw axis, beginning at the face of the screw at the feed end of the extruder. It should terminate in the flow channel at a location shortly behind the flow barrier, i.e. in the polymer-free zone. This may be, for example, within the first quarter of the circumference, beginning at the trailing side of the flow barrier. Accordingly, the fluid passage should have openings in the section of the flow channel forming one complete revolution of the channel beginning at the trailing side of the flow barrier.

Although the invention is mainly described with reference to its use for the supply of a gaseous or liquid foaming agent to a thermoplastic polymer, it may also be used with advantage for the devolatilization of thermoplastic polymers. The fluid passage in the worm screw is then connected to a vacuum pump for the withdrawal of gases from the polymer in the extruder. Indeed, the extruder is suitable for the supply or withdrawal of a gas or liquid to or from a material being extruded, irrespective of the purpose for which this is done.

Figure 2:
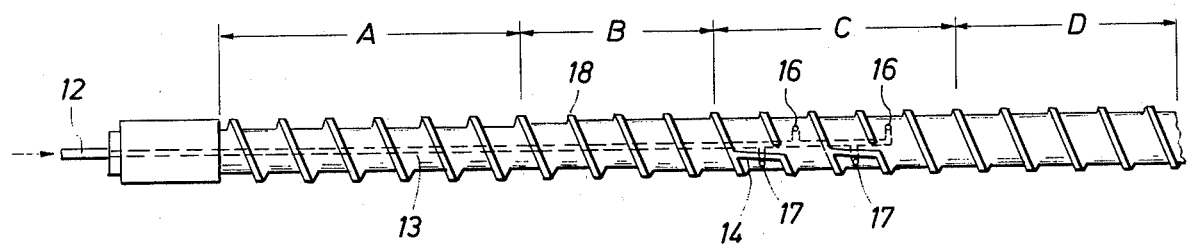
Figure 3:
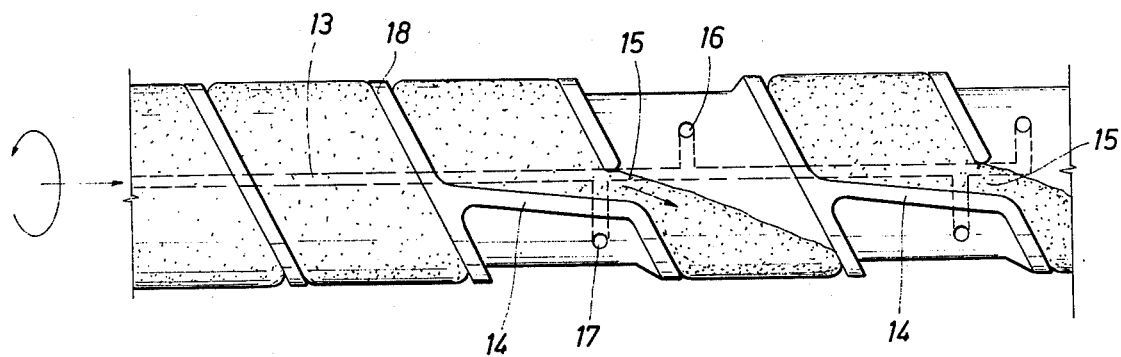

The invention will be explained further with particular reference to the accompanying drawing in which:

FIG. 1 is a general schematic view of an extruder with connected gas supply line, FIG. 2 shows the worm screw used in the extruder of FIG. 1, and FIG. 3 shows a detail of the worm screw of FIG. 2.

FIG. 1 shows a worm screw extruder 10, adapted for the extrusion of a thermoplastic polymer. A cylinder 11, filled with compressed nitrogen, is connected through a conduit 12, including pressure control means, to a central bore of the worm screw in the extruder. The worm screw is rotatable counter-clockwise in a cylindrical barrel.

The worm screw 18 with central bore 13 is illustrated in FIG. 2. The screw comprises, successively from left to right, a feed section A, a compression section B, a gassing section C, and a pumping section D. At two locations in the gassing section C, two adjacent flights of worm 18 are provided with a plate-shaped flow barrier 14, extending over the full width between the flights in a direction so that the pushing side of the flow barrier includes an angle of 15° with the axis of the worm screw. In each instance, the foremost flight is formed with a gap 15 adjacent to the forward, or pushing side of the flow barrier. The central bore 13 begins at the feed-end face of the worm screw, where it is coupled to the gas supply conduit 12, and extends to the gassing section C, where radial branches from the bore terminate in one or more openings 16, 17 at the surface of the worm screw near the rearward side of the flow barrier. When the extruder is in operation, polymer is supplied to the rotating worm screw in feed section A. During transport of the polymer in the extruder (in the drawings: to the right) it is compressed and heated so that in gassing section C the polymer has turned into a compact melt. The flow of polymer melt is arrested by flow barrier 14 and the polymer forced through gap 15, whereby the flow channel section behind the flow barrier remains free of polymer over about one complete revolution on the screw. This polymer-free space is filled with blowing agent, e.g., nitrogen gas, supplied through bore 13 and openings 16 and 17 in the worm screw. The polymer-free pocket is entirely filled with the gas, which is under pressure and diffuses into the polymer. The relatively large area of contact between the gas and polymer is conducive to fast and uniform diffusion of the gas into the polymer.

In one construction of an extruder as shown in the drawings, a worm screw was used having a constant worm pitch of 60 mm and a total operating length of 20 $d$, $d$ (the external screw diameter) being 60 mm. The worm screw sections had the following dimensions:

feed section A: length $6d$, root diameter 40 mm;
compression section B: length $4d$, root diameter increasing from 40 mm to 53 mm;
gassing section C: length $5d$, root diameter 53 mm; flow barriers in the first and third revolution of the flow channel; flight interruption 30 mm wide (measured along the flight);
pumping section D: length $5d$; root diameter 53 mm.

The extruder was used for the extrusion of a polyvinyl chloride compound at the rate of 16.8 kg/hour (worm screw rotating at 15 rpm). The pressure of the nitrogen supplied to the worm screw was 70 bars. The extrudate was a foamed polyvinyl chloride tube, the density of the material being 850 g/l and the average cell size 0.3 mm (without the use of a nucleating agent), the cells being uniformly distributed. To extrude a product of comparable qualities with a comparable conventional extruder in which the gas was injected through a port in the extruder barrel, the total length of the worm screw had to be 25 $d$, composed of:

| | |
|---|---|
| feed section | 6 d |
| compression section | 3 d |
| pumping section | 5 d |
| decompression section | 1 d |
| gassing section | 4 d |
| compression section | 1 d |
| pumping section | 5 d |

In the primary use of the extruder of the present invention, in which a gas is supplied as the blowing agent, the conduit or channel inside the screw root connects from a reservoir, such as a gas cylinder or compressor, to the openings inside the extruder. When a volatilizable liquid is used, the channel connects from a fluid reservoir, such as a tank from which liquid is pumped to the openings inside the extruder. When the extruder is employed as a devolatizing extruder, vapors are withdrawn through the opening inside the extruder, through the conduit, to an evacuating means. They may be condensed and sent to a fluid reservoir or, in the case of innocuous vapors, exhausted to the atmosphere. For convenience of description, the term "reservoir" as used in the attached claims refers to either a gas or volatizable fluid supplying reservoir or the space to which vapors from the inside of the extruder are withdrawn.

I claim as my invention:
1. An improved single screw, direct gassing extruder assembly comprising:
    1. a casing having an upstream end and a downstream end and, in said casing,
    2. a worm screw having
        a. a spiral thread and,
        b. a fluid conduit inside the root of the screw communicating externally with a fluid reservoir and internally through at least one opening located between two adjacent worm flights with the space between the root of the screw and the casing,
    3. a fluid contact means comprising:
        a. a solid flow barrier extending between and connecting said adjacent worm flights, said barrier having substantially the same clearance with regard to the casing as the worm screw and having a forward side and a rearward side and,
        b. a gap extending substantially from root to top of flight in the downstream worm flight of said adjacent worm flights adjacent to the forward side of said barrier at a point where said barrier connects to the downstream worm flight of said adjacent worm flights and,
        c. said opening located between said two adjacent worm flights, near the rearward side of said barrier,
whereby when the extruder is in operation on a thermoplastic feed, plasticized feed being forwarded by said rotating worm screw is blocked by said flow barrier at its forward side and forced through said gap, and a space free of plasticized feed is maintained between said two adjacent worm flights adjacent the rearward side of said barrier in the vicinity of said opening.

2. Extruder as claimed in claim 1, wherein the width of said gap in the flight is less than the width of the channel between said adjacent flights.

3. Extruder as claimed in claim 1 wherein said flow barrier is positioned so that its forward side includes an acute angle with the axis of the worm screw.

4. Extruder as claimed in claim 1 wherein the arrangement of said flow barrier and flight gap is repeated at least once, and the fluid passage is extended accordingly.

* * * * *